April 2, 1968 — R. L. SMIRL — 3,375,911
CLUTCH PLATE EMPLOYING TORSION DAMPER
Filed Jan. 3, 1966 — 2 Sheets-Sheet 1
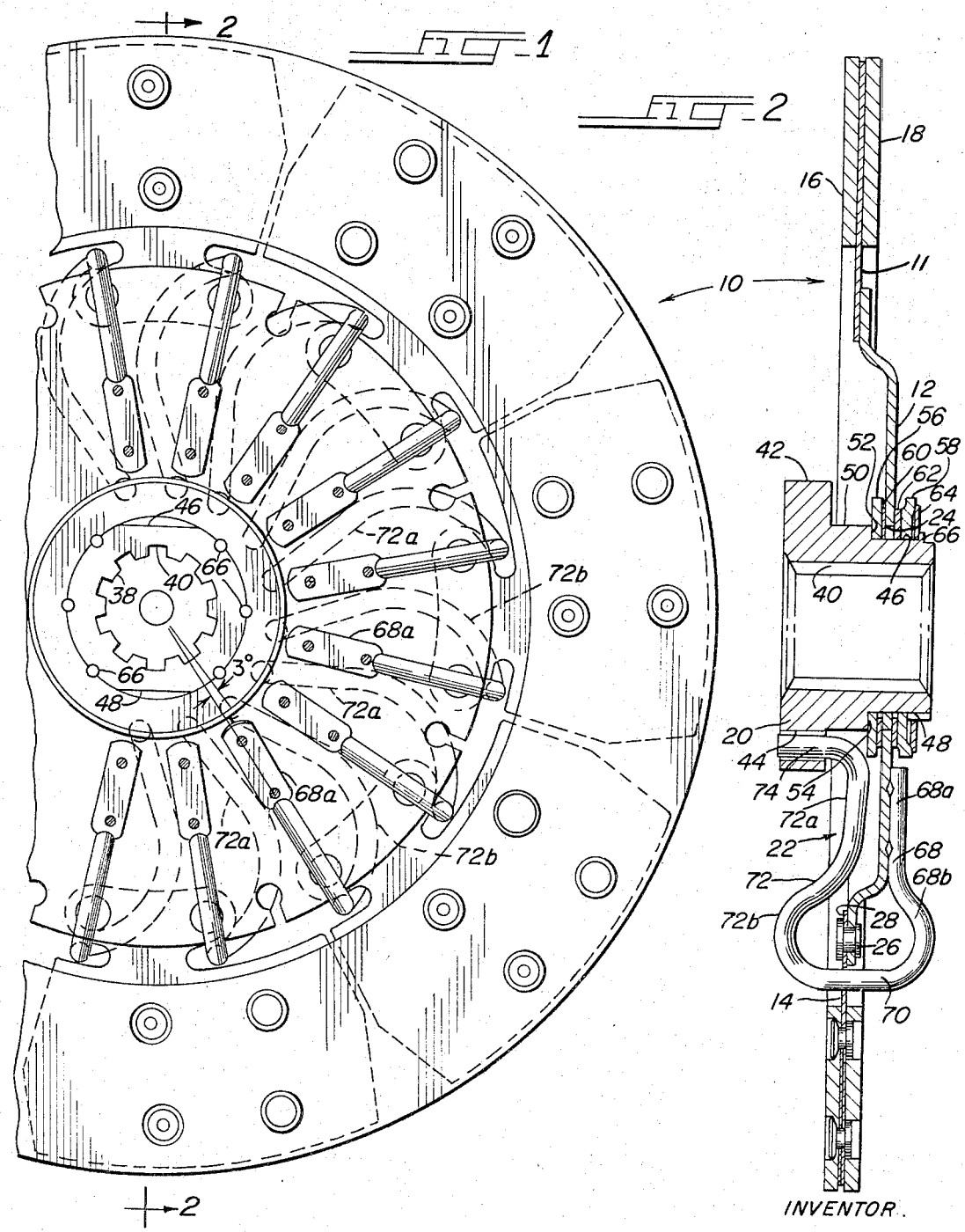
INVENTOR.
RICHARD L. SMIRL

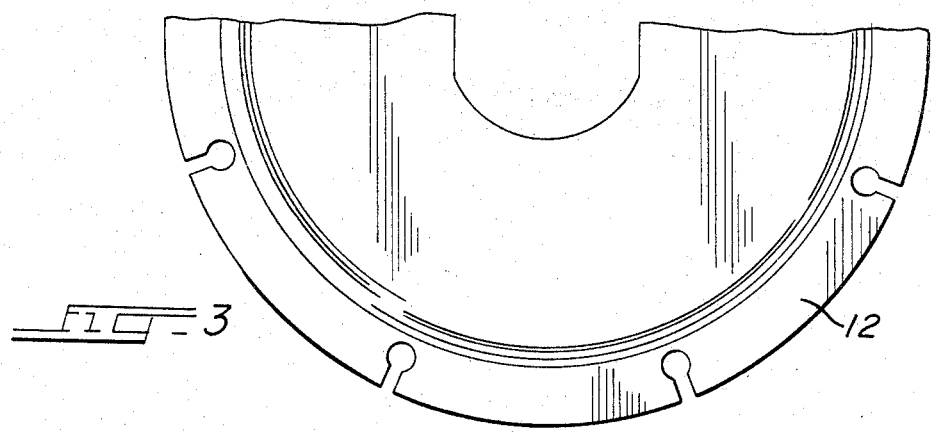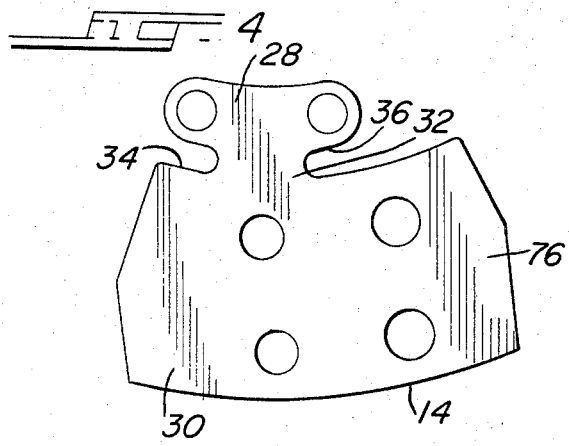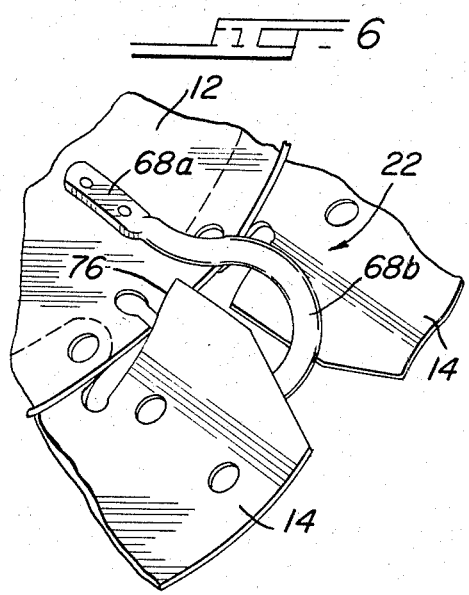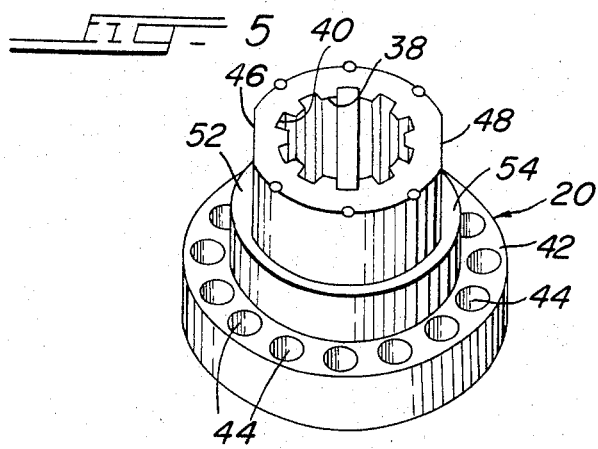
INVENTOR.
RICHARD L. SMIRL

United States Patent Office 3,375,911
Patented Apr. 2, 1968

3,375,911
CLUTCH PLATE EMPLOYING TORSION DAMPER
Richard L. Smirl, La Grange Park, Ill., assignor to Borg-Warner Corporation, Chicago, Ill., a corporation of Illinois
Filed Jan. 3, 1966, Ser. No. 518,299
11 Claims. (Cl. 192—107)

ABSTRACT OF THE DISCLOSURE

A vibration damper includes a plurality of loop-shaped wire members interconnected between relatively rotatable inner and outer members wherein the wire members are subjected to torsional and bending movements as said inner and outer members move with respect to each other.

---

This invention relates to clutch plates and more particularly to a damper means for assuring a smooth transmission of torque between a clutch disc body and a hub with which it is associated.

Present day automotive engines speeds are relatively high and consequently automotive clutches associated with such engines are subjected to substantial forces. One of the continuing problems, for example, is to encourage a friction type clutch with a minimum of shock in establishing a drive between driving and driven members. For example, in an automotive vehicle an engine is drivingly connected to a flywheel. A shaft which is to be driven is coaxially mounted in relation to the flywheel and a clutch plate is attached to the driven shaft. Friction facings on the outer edge of the clutch plate are brought into engagement with the flywheel by a pressure plate so that torque is transmitted to the driven shaft through a hub at the center of the clutch plate, the hub being keyed onto the driven shaft. At high speeds the clutch disc body and the hub are subjected to substantial shock unless adequate means are provided to absorb the shock of engagement. In the past coil compression springs have been used to accomplish this objective. They have been mounted in the clutch disc structure with their axes extending generally transversely to the axis of rotation of the clutch disc as shown, for example, in U.S. Patent 2,742,992. But such a structure has its limitations. For example, the number of springs that may be used is quite limited due to the space available, and therefore, the torque absorption capacity is limited. In addition, the increasingly higher speeds at which automotive engines are designed to operate exert higher torques on clutch assemblies associated therewith, thus requiring higher torque obsorption capacities.

Accordingly a principal object of this invention is to provide a clutch damping device which will effect a smoother transmission of driving forces between two members.

Another object is to provide a novel damping means disposed between a clutch disc body and the hub on which the disc body is mounted to reduce the shock loads transmitted between the disc and the hub and a shaft member which in operation would normally be attached to the hub.

A further object is to provide in a clutch plate assembly damping means between a clutch disc body and the hub member on which it is mounted which is able to withstand increased torque loads.

Still another object is to provide damping means in accordance with the above objects which comprises a plurality of wire spring loop members disposed between a clutch plate disc body and its associated hub member in such a manner that torque will be absorbed by the damping members through both ending and torsional stresses applied thereto.

The above and other objects and advantages of the invention will be more readily apparent when read in connection with the accompanying drawings in which:

FIGURE 1 is a partial plan view of a clutch plate assembly embodying the present invention;

FIGURE 2 is a view in section of the clutch plate assembly taken along the line 2—2 of FIGURE 1;

FIGURE 3 is a plan view of a portion of the clutch disc;

FIG. 4 is a plan view of a cushion spring member of the illustrated clutch plate assembly;

FIGURE 5 is a perspective view of the hub member of the illustrated clutch plate assembly;

FIGURE 6 is a perspective view of a portion of the assembly of the clutch disc, cushion springs and damper members.

Referring now to the drawings in which like reference characters designate the same parts 10 designates generally a clutch plate assembly such as may be used, for example, in an automotive clutch unit utilized to transmit a drive between an engine driven flywheel and a driven shaft. The clutch plate assembly 10 comprises a clutch plate 11 which includes an annular clutch disc body 12, a plurality of cushion spring members 14, and friction facings 16 and 18. The clutch plate assembly 10 also includes a hub member 20 and a plurality of torque damping members 22 secured to the disc body 12 and the hub member 20.

The clutch disc body 12 is an annular substantially dish-shaped sheet metal member, and it has a central opening 24 formed therein for receiving a portion of the hub member 20.

A plurality of cushion spring members 14 in the form of segments are secured to the outer periphery of the disc body 12 by suitable means such as rivets 26. Each of the cushion spring members comprise an inner radial tab portion 28 and an outer radial portion 30. The two portions 28 and 30 are connected by a narrow neck portion 32 so that there are defined between the inner portion 28 and the outer portion 30 circumferentially extending grooves or slots 34 and 36. The members 14 may be made of a relatively thin piece of flexible spring steel material. The members 14 are attached to the disc body 12 by the rivets 26 which extend through the tab portion 28.

The friction facings 16 and 18 may be of any conventional friction material and are secured to opposite sides of the outer portions 30 of the spring members 14.

The hub member 20 is of generally cylindrical nature. It may be made from steel or sintered iron, for example. An opening 38 is formed at the center thereof and may have a plurality of splines 40 formed therein for connection to a shaft to be driven. A radially extending flange 42 is formed at one end of the hub 20. A plurality of axially extending cylindrical openings 44 are formed in the flange 42. These are each adapted to receive one end of the damping members 22.

At the end of the hub member opposite the flange 42, axially extending flats 46 and 48 are formed on a portion of the cylindrical surface 50 of the hub member 20. The flats 46 and 48 and the adjacent portion of the cylindrical surface 50 define shoulders 52 and 54 respectively. The clutch disc body 12 is supported on the hub member between friction reaction washers 56 and 58 and friction shims 60 and 62, the shims 60 being placed immediately adjacent the disc body 12 and the washers 56 and 58 being positioned against the shims. A belleville spring washer 64 is positioned against the outer washer 58 and is secured in place by appropriate staking means such, for example, as the local staking shown at 66. A full ring stake may also be used. The washers 56 and 58 and the shims 60 and 62 are keyed to the hub 20 by the flats 46 and 48 and thus are restrained against circumferential movement with respect to the hub. The opening 24 in the disc body 12 is slightly larger than the cylinder defined by the cylindrical surface 50. Thus the disc body 12 is free to rotate on the hub member 20 to the extent that it is not otherwise restrained. A preload force is put on the belleville spring washer 64 so that the clutch disc body 12 is clamped between the friction shims 60 and 62 with a predetermined force.

The damping members 22 are preformed continuous wire spring members and in a preferred form each is bent into a shape comprising essentially four portions 68, 70, 72 and 74. The spring members 22 may be made of a wire approximately 5/32" in diameter but this size may vary. As best seen, in FIGURES 1 and 2, the portion 70 joins portions 68 and 72 of the damping member 22. In the assembled condition the portion 70 is disposed substantially parallel to the axis of the clutch plate 10. To form the connection between 68 and 70 the lower or radially outermost part of portion 68 is formed into a large radius portion 68b.

The portion 72 comprises a relatively straight upper portion 72a and a lower curved portion 72b. The upper portion 72a preferably is disposed at an angle of approximately 20–30° with respect to the plane defined by portions 68 and 70. The lower curved portion 72b extends between and connects 72a and 70. It will be observed that the portion 72b is bent in a spiral-like form so that the portion 72b does not lie in planes which are either parallel to or perpendicular to the axis of rotation of the clutch plate. The member 22 is further bent to provide the axial extending portion 74 at the upper end of portion 72 as viewed in FIGURE 2. In the assembly the portion 74 is loosely journalled for rotation in an opening 44 in the flange 42 of the hub 20.

The member 22 is bent into the position shown to assimilate both torsional and bending forces.

The upper portion of 68 is flattened at 68a so that it may be easily secured to the clutch disc body 12 by spot welding or other suitable means. In the clutch plate assembly the portion 68 of the members 22 are secured in a substantially radially extending position. It will be observed that the ends 68a of the members 22 are secured to one side of the disc body 12 and then extend through the slots 34 and 36 to loop around the outer periphery of the disc body 12.

As viewed in FIGURE 1 it is contemplated that the clutch plate as shown would rotate in a counterclockwise direction. It will be observed that the axes of the damper member journals, portions 74, are offset in a circumferential direction from a radial line through the radial innermost ends of portions 68 of the members 22. This offset preferably is about 3°–4° in a clockwise direction. It is contemplated that the maximum deflection of the disc body 12 with respect to the hub member 20 would be about 7°–8°. Thus the journal portion 74 of a member 22 would be located approximately midway between the total expected angular travel of the anchored end of the damping member 22.

The members 22 are assembled to the sub-assembly of the cushion spring members 14 and disc body 12 by deflecting the flag portions 76 of the members 14. Then the hub 20 and the friction shim members 60 and 62 and the friction reaction washers 56 and 58 are assembled to locate and position the spring members 14 prior to resistance welding the spring tab portions 28 to the disc body 12.

The damping spring members 22 disclosed herein which are the important feature of this invention are capable of absorbing substantial shock loads. In operation both torsional and bending forces are applied to these members. For example, in a clutch assembly when the clutch mechanism is engaged by the action of a pressure plate forcing the clutch plate into engagement with a flywheel and the clutch plate 11 is forced to turn counterclockwise, the initial force of engagement will tend to displace the upper ends 68a of the members 22 in a clockwise direction about the horizontal portion 70. This subjects the portion 70 to a torsional stress. At the same time the portion 72 will have a bending stress applied thereto and will tend to bow in a counterclockwise direction about the journalled end 74.

In addition the portion 68 will have a bending stress applied thereto tending to bow the portion 68 in a clockwise direction about the horizontal portion 70. Thus the greater part of the length of the damping spring members 22 is utilized in some way to absorb the shock of engagement and disengagement of the clutch unit.

The portion 72 of the member 22 by virtue of its bent arrangement also minimizes the tensile forces that might otherwise be placed on such a member if no initial bowing in the portion 72 were present. In other words at the instant of engagement, for example, as the distance between journalled end 74 and the portion 70 tends to increase slightly, stretching of the portions 68 and 72 is not necessary because these portions have in them sufficient "extra" material lengths so that bending can absorb the forces causing the displacement.

Because the damping spring member is generally in the form of loop bent back upon itself, the effective length of the spring member is approximately twice its radial extent. The two arms 68 and 72 of the spring member 22 thus provide more capacity than if only one arm were connected between the hub and disc body.

By virtue of the relatively loose axially extending journaling arrangement for the ends 74 of the spring member 22 no significant torsional stresses are placed on the ends of the spring members. In addition the structural arrangement precludes any significant wear on the hub member itself and thus the hub member can be made of sintered iron, for example.

It will be observed that the torque damping capabilities of this type of arrangement in a clutch plate assembly can easily be increased to accommodate heavier loads by using wire of larger cross sectional area for the damping members. Capacities may also be varied by increasing or decreasing the number of the damping members 22. In a clutch plate having a diameter of approximately 9¾", 16 spring wires have been used. For smaller capacities 8, 12 or 14 wires, for example, may be used.

As previously noted the clutch disc body 12 is clamped between the friction shims 60 and 62. The extent of the clamping force is determined by the preload on the belleville spring washer 64. Thus the assembly including the friction shims, reaction washers and belleville spring which holds the clutch disc body 12 in place also is effective to exert a torque damping effect on the clutch plate, and therefore, adds to the damping effect provided by the members 22.

The ends of the slots 34 and 36 in the cushion members 14 are effective to act as travel stops for damping members 22, and as will be observed from FIGURES 1 and 2 act on the portions 70 thereof.

Thus it will be appreciated that I have advantageously provided novel damping means for incorporating in a clutch plate assembly. These damping means are constructed in such a manner that both torsional and bending resistance forces are used to damp out the torque shock loads applied to the clutch plate assembly. This becomes particularly important in installations where the clutches operate at high speeds.

While a preferred embodiment of the invention has been specifically disclosed, it is understood that the invention is not limited thereto as many variations will be readily apparent to those skilled in the art and the invention is to be given its fullest possible interpretation within the terms of the following claims.

I claim:
1. A clutch plate assembly comprising:
   an outer clutch disc body having an outer periphery;

friction material associated with said outer periphery of said clutch disc body;
an inner hub member coaxially disposed with respect to said clutch disc body;
a plurality of damping members interconnecting said clutch disc body and said hub member;
said damping members each comprising a wire member having a first portion extending radially outwardly from said hub toward said outer clutch disc body, a second portion defining an open loop configuration, and a third portion extending radially inwardly toward said hub member, said first portion and said third portion defining two ends;
first means for securing one end of said damping members to said disc body; and
second means for securing the other end of said damping members to said hub member.

2. The clutch plate assembly of claim 1 wherein said open loop wire damping members each comprise two substantially radially extending portions, adapted to take bending stresses during relative circumferential movement between said disc body and said hub member.

3. The clutch plate assembly of claim 2 wherein one of said substantially radially extending portions of said damping members is bent in a plane substantially normal to the axis of rotation of said clutch plate assembly whereby stresses on said one of said substantially radially extending portions are better absorbed.

4. The clutch plate assembly of claim 1 wherein said two ends of each of said damping members are secured respectively to said disc body member and said hub member at positions radially inwardly of the closed end of said loop wire member.

5. The clutch plate assembly of claim 4 wherein said end secured to said disc body member is fixed thereon and the end secured to said hub member is loosely journalled therein along an axis substantially parallel to the axis of rotation of the clutch plate assembly.

6. The clutch plate assembly of claim 1 wherein said open wire loop damping members each comprise two substantially radially extending portions and a substantially axially extending portion connecting said radially extending portions,
said radially extending portions being adapted to take bending stresses, and said axially extending portion being adapted to take torsional stresses during relative circumferential movement between said disc body and said hub member.

7. The clutch plate assembly of claim 6 wherein said axially extending portion of said damping member extends through said clutch plate.

8. The clutch plate assembly of claim 7 including stop means for limiting the travel of said damping members.

9. The clutch plate assembly of claim 1 wherein said two ends of each of said damping members are secured respectively to said disc body member and said hub member at positions radially inwardly of the closed end of said damping member, said two ends being axially spaced from each other, and
said end connected to said hub member being axially directed and journalled for rotative movement in said hub member.

10. The clutch plate assembly of claim 1 wherein each of said open loop wire damping members comprises,
a first substantially radially extending portion connected to said disc body,
a second generally radially extending portion,
a third substantially axially extending portion connecting said first and second portions, and
a fourth substantially axially extending portion connected to said second portion at the radially innermost end thereof said fourth portion being journalled in said hub member.

11. The clutch plate assembly of claim 1 including friction clamping means for frictionally supporting said clutch disc body on said hub members, said friction clamping means being effective to permit circumferential movement of said clutch disc body with respect to said hub member.

References Cited

UNITED STATES PATENTS

| | | | |
|---|---|---|---|
| 2,260,869 | 10/1941 | Ruesenberg | 192—107 X |
| 2,307,006 | 12/1942 | Wemp | 192—107 |
| 3,218,828 | 11/1965 | Thelander | 192—107 |

FOREIGN PATENTS

| | | |
|---|---|---|
| 931,971 | 7/1963 | Great Britain. |
| 959,249 | 5/1964 | Great Britain. |

ROBERT M. WALKER, *Primary Examiner.*

CARLTON R. CORYLE, *Examiner.*

A. T. McKEON, *Assistant Examiner.*